March 9, 1943.  F. X. LAMB  2,313,444
PRECISION GEARING
Filed Oct. 23, 1941  2 Sheets-Sheet 1

Inventor:
Francis X. Lamb,
By Pierce & Scheffler
Attorneys.

March 9, 1943.  F. X. LAMB  2,313,444
PRECISION GEARING
Filed Oct. 23, 1941  2 Sheets-Sheet 2

Inventor:
Francis X. Lamb,
By Pierce & Scheffler
Attorney

Patented Mar. 9, 1943

2,313,444

UNITED STATES PATENT OFFICE 2,313,444

PRECISION GEARING

Francis X. Lamb, East Orange, N. J., assignor to Weston Electrical Instrument Corporation, Newark, N. J., a corporation of New Jersey Application October 23, 1941, Serial No. 416,275

14 Claims. (Cl. 74—461)

This invention relates to precision gearing for transmitting angular motion without free play or backlash, and particularly to precision gearing operable by the minute forces of the order of those developed by sensitive measuring instruments.

In the design of present gearing systems, it is necessary to provide a certain amount of clearance between the surfaces of coacting teeth on adjacent gears, otherwise the teeth will interwedge and jam. This clearance is commonly referred to as free play and varies in magnitude with the type of gears employed. It becomes manifest as backlash when the direction of rotation of the gearing system is reversed. Such backlash is unimportant in a gearing system employed primarily for the transmission of power but becomes objectionable in delicate measuring or indicating instruments designed for precision transmission and/or translation of motion. In such applications, free play appears as a direct error in the measurement or indication.

Various proposals have been made for the elimination of free play and backlash, but all of the prior designs have imposed an additional load or power requirement of appreciable magnitude upon the prime mover. The additional load is not objectionable so long as adequate power is available to operate the driven member and to overcome the losses in the gearing system but sensitive measuring and indicating instruments do not develop sufficient power to compress the resilient gear teeth or to stretch the torsion springs of the prior no-backlash gearing systems.

An object of the present invention is to provide a novel gearing system that eliminates free play without imposing any substantial load upon the prime mover, whereby motion may be transmitted and translated with a degree of precision heretofore unobtainable. An object is to provide a precision gearing system comprising a driver gear and a driven gear, one of said gears having tooth elements in the form of longitudinally resilient filaments that are rigidly secured to the associated shaft at points remote from their respective regions of engagement with the other gear.

An object is to provide a precision gearing system including a rigid gear and a gear having resilient filaments constituting the tooth elements, the normal pitch circles of the gears overlapping and the working pitch diameter of the filar gear varying as the filamentary teeth are flexed radially as they move into and out of engagement with the other gear, whereby motion is imparted to the driven gear without free play or backlash. Another object is to provide a no-backlash gearing system comprising a rigid driver gear and a driven gear with axially elongated teeth of elastic filaments that flex, without imposing any appreciable load upon the driven gear, to eliminate free play and backlash. An object is to provide a precision gearing system of the type stated in which the normal pitch circles a rigid gear and filar gear overlap at the region of gear engagement, and at least one of the gears is movable to permit adjustment of the degree of overlap of the pitch circles. A further object is to provide a motion-multiplying gearing for use with sensitive measuring instruments, the gearing comprising a rigid driver gear actuated by the moving system of the instrument, and a filar driven gear carrying the pointer.

These and other objects and advantages of the invention will be apparent from the following specification when taken with the accompanying drawings in which.

Figure 3:
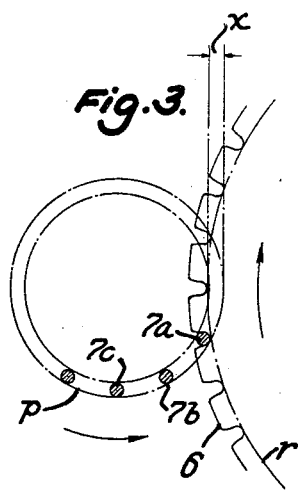
Figure 4:
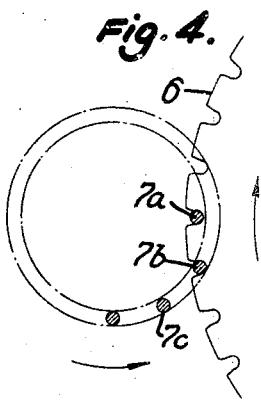
Figure 5:
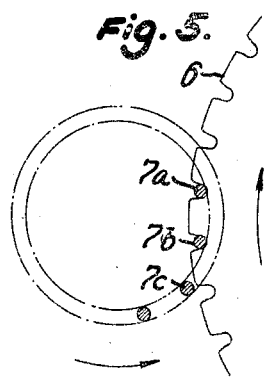
Figure 6:
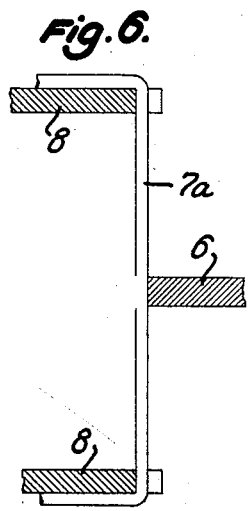
Figure 7:
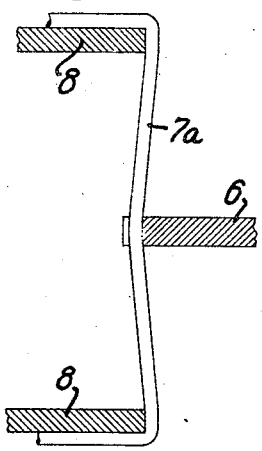
Figure 8:
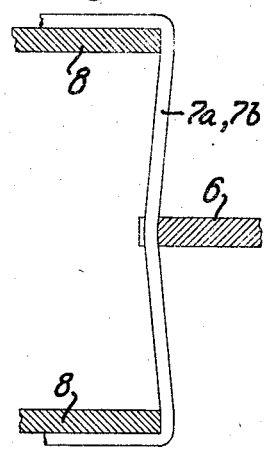
Figure 9:
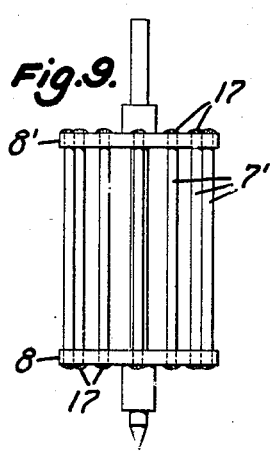

Figs. 3 to 5, inclusive, are schematic views, looking axially of the gears and illustrating the progressive variation in the pitch diameter of a filamentary tooth element as it moves into and out of engagement with the rigid driver gear;

Figs. 6 to 8 inclusive are corresponding schematic views, in elevation, illustrating the elongation and flexing of the filar gear elements as they are engaged by the rigid driver gear;

Fig. 9 is a side elevation of another form of filar gear; and

Figure 10:
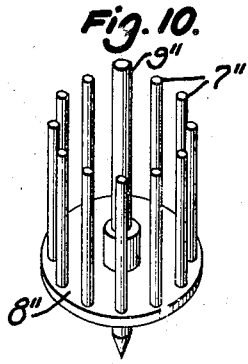

Fig. 10 is a perspective view of a further modification.

Figure 1:
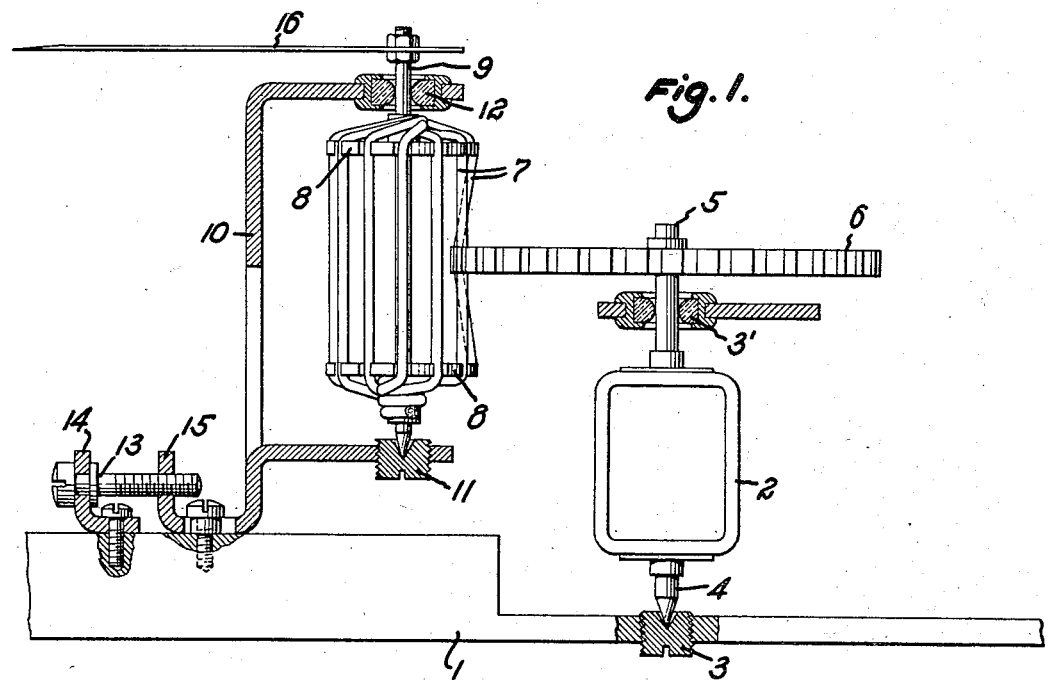
Fig. 1 is an enlarged fragmentary side elevation, with parts in section, of a measuring instrument including a precision gear system embodying the invention.
Figure 2:
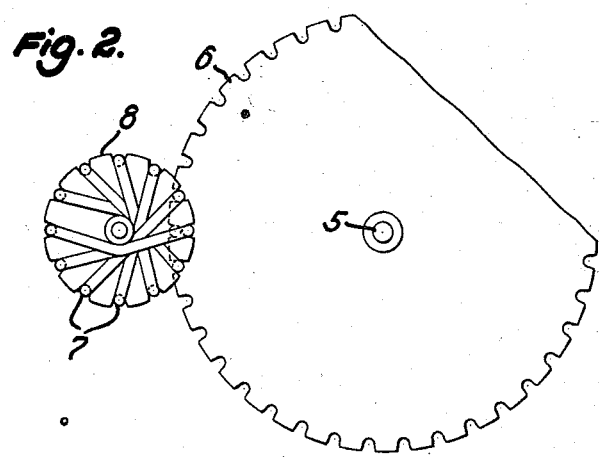
Fig. 2 is a fragmentary plan view of the gearing system.

In Figs. 1 and 2 of the drawings, the reference numeral 1 identifies the base or sub-base of an electrical measuring instrument having a moving system comprising a coil 2 that is pivotally supported in jewel bearings 3, 3' by a pivot 4 and staff 5, respectively. The instrument moving system is an example of "prime movers" of minute power output that could not drive a no-backlash gearing of prior designs. The particular construction of instrument, or other device, with which the novel gearing is to be used forms no part of the present invention and, for simplicity, the full structure of the instrument is not illustrated in Fig. 1.

The novel gearing, as shown in Figs. 1 and 2, comprises a rigid spur gear 6 on the staff 5, and a driven gear formed by a cylindrical array of taut, longitudinally resilient filaments 7 that extend between and have their ends rigidly supported by a pair of axially spaced disks or radial flanges 8 on the staff 9. It is to be noted that the thickness of the filaments is not shown to scale in the drawings as the diameter of a filament is only a minute fraction of its length. The filaments 7 constitute the tooth elements of the driven gear, and they may be threads of silk or plastic materials, natural or synthetic bristles, wire or strands of any elastic material capable of slight transverse bending and adapted to be cemented or otherwise secured to the disks or flanges 8. The essential requirement is that each filamentary tooth element must be longitudinally resilient throughout the small range of stretching to which it is subjected as a result of the transverse deflection of the central portion of the tooth element as it moves into and out of engagement with the driver gear 6. The filar teeth may be formed by winding a long strand in notched edges of the disks 8, see Figs. 1 and 2, or by securing individual filaments in openings at the edges of the disks. The staff 9 is rotatably mounted on a bracket member 10 by jewel bearings 11, 12, and the bracket member may be adjusted towards and away from the axis of the driver gear 6 by a screw 13 that rotates in a stationary plate 14 and is threaded into a lug 15 of the bracket member. The staff 9 carries a pointer 16 that moves along a scale, not shown, and the design of the gearing may be such that the pointer 16 is rotated through 360° or more by the angular displacement of the moving system of the instrument.

The driver gear 6 is thin, in comparison with the length of the filar gear teeth 7, and engages only the central portions of the filaments. The relatively long resilient filaments flex readily under the minute torque developed by the moving system of the measuring instrument when the filar driven gear is adjusted towards the driver gear to eliminate clearance and backlash.

The root diameter of conventional gears is always less than the pitch diameter to provide clearance that is necessary to prevent a jamming of the cooperating gears. According to this invention, the spacing of the axes of the gears may be less than that corresponding to a zero clearance, and this condition will be termed an adjustment of the clearance to a "negative" value. Angular motion is imparted to the driven gear by its surface contact on the rigid driver gear, and the pitch diameter and root diameter of the driver gear are therefore equal. The normal pitch diameter of the filar gear is the distance between the outer surfaces of diagonally opposite filaments 7, and this pitch diameter circle $p$ normally overlaps the root diameter circle $r$ of the rigid gear 6 by an amount $x$, see Fig. 3, that is the negative clearance of the meshing gears.

The method of operation of the precision gear system will be apparent from a consideration of the diagrammatic views, Figs. 3 to 8 inclusive, in which the horizontal dimensions are greatly exaggerated for clarity of illustration. The spur gear 6 is assumed to rotate in a clockwise direction, corresponding to an increase in the measured quantity in the case of deflection-multiplying system for a measuring instrument, and only a limited number of the filar tooth elements 7a, 7b, etc., of the relatively small diameter filar gear are illustrated. The clockwise rotation of the driver gear 6 brings a strand or filamentary tooth element 7a of the driven gear into engagement with the root circle surface of the gear 6 shortly before the strand 7a reaches the plane through the axes of the gear 6 and the staff 9 of the filar gear, see Figs. 3 and 6. The strand 7a is still in its normal taut, linear condition but further rotation of the gear 6 results in an increasing transverse deflection of the strand 7a until it reaches the plane through the axis of the gear elements, see Figs. 4 and 7. The strand 7a is now subjected to maximum transverse deflection and longitudinal stretching, and the adjacent strand 7b has engaged the root surface of the rigid gear 6 but is not yet subjected to stresses that result in deformation.

Any further advance of the gear system results in a progressive decrease in the transverse deflection of the strand 7a and a corresponding increase in the transverse deflection of the strand 7b. The strands 7a, 7b are subjected to substantially equal deformations upon a further advance of the gearing into the positions shown in Figs. 5 and 8. Since the strands are longitudinally resilient, the progressive transverse deformation of the strand 7a as it moved in the Fig. 4 position was accompanied by a progressive stretching or longitudinal deformation that represents a store of energy that is gradually released upon movement of the gearing beyond the position illustrated in Figs. 4 and 7. The strands thus flex gradually during operation of the gearing, and move smoothly into and out of engagement with the teeth of the driver gear. The extent of the flexing is not critical and may be regulated, by adjusting the filar gear with respect to the driver gear, to the minimum value that will eliminate clearance and free play under all operating conditions. It is desirable to design the gears so that two or more strands are simultaneously in mesh with the rigid teeth of the gear 6 to promote smooth operation and prolonged life.

The filar gear responds positively and accurately to the rotation of the spur gear since there is no free play between the coacting tooth elements, and a reversal of the direction of rotation of the spur gear produces a corresponding motion of the filar gear. These operating characteristics are obviously essential in any gearing system for multiplying the angular displacement of the moving element of a precision measuring instrument. Another and more exacting requirement is that the motion-multiplying system should impose substantially no load upon the measuring instrument movement since, if the instrument is rendered inaccurate by the imposed load of the motion-multiplying system, the amplified pointer displacement may result in less accurate readings than those obtained with conventional instruments in which the pointer is directly actuated by the moving system of the instrument.

The instrument movement of Fig. 1 must overcome the frictional resistance of angular motion in its own supporting bearings, as in any conventional instrument, and must also overcome the frictional resistance to rotation of the pointer staff 9 and the resistance to elastic deformation of the filar tooth elements 7 of the driven gear. Jewel bearings of conventional or desired design impose a negligible resistance to the rotation of the staff 9, and the power required to flex the resilient tooth elements 7 can be reduced to any desired minute value by an appropriate selection of the length-to-diameter ratio of the filar tooth elements 7. It has been proposed, in power transmitting gearing, to eliminate backlash by meshing a rigid gear with a spur gear having teeth of a resilient material such as rubber. Such constructions could not be employed in a motion-multiplying system for a sensitive measuring instrument as the forces required to compress the resilient teeth of the driven spur gear are of an order substantially higher than the torque developed by a sensitive measuring instrument.

The negligibly small magnitude of the load imposed upon the instrument movement by a filar gear system such as contemplated by this invention will be apparent from a consideration of the following data with respect to one embodiment of the invention. The filar gear in that case comprised a thread of "nylon" of 0.0017 inch diameter wound between end disks 8 that were axially spaced by 0.60 inch. Assuming that it were possible to construct a resilient spur gear, according to prior practice in power transmission gearing, of a sheet of nylon of 0.0017 inch thickness, a mathematical study of the two gearings will show that the force required to compress the teeth of the resilient spur gear is more than 104,000 times the force required to flex the filar gear teeth. The ratio will be still higher when the thickness of the resilient spur gear is increased to a practical value, and can be increased to still greater values by decreasing the diameter or increasing the length of the filar tooth elements.

It is convenient to form the filar gear by winding an elongated thread or fine wire under a slight tension in notches at the edges of the disks 8, but the filar teeth of the driven gear may be formed by individual strands, bristles or wires. As shown in Fig. 9, individual strands 7' extend through annular arrays of openings at the edges of the end disks or gear flanges 8', and are secured to one or both of the flanges by drops of glue or cement 17. As shown in Fig. 10, the correspondingly arranged ends of filaments 7" may be secured to only one mounting disk 8". The free ends of the bristles or wires are engaged by the rigid driver gear, and the filaments take the form of resilient bristles or wires of sufficient stiffness to rotate the staff 9" without backlash.

It is to be understood that the invention is not limited to any particular adjustment of the gear elements with respect to each other. It is usually desirable to eliminate all positive clearance and to adjust the gears to a "negative" clearance, but it is apparent that the cooperating gears may be adjusted to provide a minute but definite amount of clearance under normal conditions of operation. This clearance may be far less than has been required to prevent jamming of conventional gears since, if changing conditions eliminate the clearance, the filar gear system will still function properly as the individual filaments 7 will then flex transversely when the clearance decreases below zero to a negative value. The gear 6 will usually be formed of metal but other, and inherently resilient, materials may be used. For most practical purposes, the gear which engages the filar gears will be substantially rigid in view of the low deflection or flexing resistance of the elongated filamentary teeth of the filar gear.

The rigid spur gear 6 is the driver element in the illustrated embodiment of the invention, but the filar gear may be the driver element in other adaptations of the invention or, in more complex gear trains, a filar gear may be an idler element, a driver element or a driven element. The filar gear constructions are not limited to the transmission of motion between parallel shafts as the filar gears are also useful in bevel gearing.

The illustrated precision gearing system provides a "step up" or multiplication of the angular displacement of the driver gear but the motion transmitting gearing may be designed to provide an equal or a less than equal displacement of the driven staff for a given angular displacement of the driver staff.

It is broadly new, so far as I am aware, to transmit angular motion by means of a filar gear having as the teeth thereof elongated strands, bristles or wires that are resiliently deformed transversely in the normal operation of the gearing, the filar gear teeth being of such inherent resilience that the transverse deformation introduces a dead load or energy loss that is negligible in comparison with the energy available for operating the motion-transmitting system. It is therefore to be understood that the invention is not restricted to the specific constructions herein illustrated and described, and that various modifications may be made within the scope of my invention as set forth in the following claims.

I claim:

1. A gearing comprising a rigid gear in mesh with a filar gear, and means pivotally supporting said gears with the normal pitch circle of the filar gear overlapping the pitch circle of the rigid gear, said filar gear comprising longitudinally resilient filamentary tooth elements and means rigidly securing the opposite ends thereof to a staff at points axially spaced from their respective regions of engagement with the rigid gear, whereby said filamentary tooth elements may be transversely deformed during rotation of the gearing.

2. In a precision gearing, a rigid gear, a gear having transversely-deformable resilient filar teeth supported at points displaced axially from said rigid gear, and means supporting said gears for relative movement to adjust the clearance between said gears through zero to a negative value.

3. In a precision gearing for multiplying the angular displacement of the moving system of a sensitive measuring instrument, a rigid driver gear adapted to be rotated by the instrument movement, and a filar driven gear having a normal pitch circle smaller than the pitch circle of said driver gear; said filar gear comprising a staff adapted to carry a pointer, flange means on said staff and axially spaced from said driver gear, and longitudinally resilient filaments having their opposite ends fixed to said flange means and constituting transversely deflectible tooth elements for meshing engagement with said driver gear.

4. In a precision gearing, a rigid gear, a filar gear in mesh with said rigid gear, and means for relatively moving said gears to adjust the clearance of the gears through zero to a negative value; said filar gear comprising a staff having flange means spaced axially from said rigid gear, and longitudinally resilient filaments carried by said flange means and constituting transversely deflectible tooth elements for meshing engagement with said driver gear.

5. In a precision gearing, a filar gear comprising a staff, radial flange means carried by said staff, and a cylindrical array of longitudinally resilient filaments supported by said flange means and constituting the tooth elements of the filar gear, and a gear in mesh with the filaments of said filar gear at a region spaced from said flange means, said filaments being stretched longitudinally during normal operation of the gearing by transverse deflections of the filaments by the second gear.

6. In a precision gearing, the invention as claimed in claim 5, wherein said radial flange means comprises a pair of axially spaced flange members, and said filaments are taut synthetic fibers of organic material.

7. In a precision gearing, the invention as claimed in claim 5, wherein said radial flange means comprises a pair of axially spaced flange members, and said cylindrical array of resilient filaments comprises a continuous winding of an elongated resilient strand seated in notches at the edges of said flange members.

8. In a precision gearing, the invention as claimed in claim 5, wherein said radial flange means comprises a pair of axially spaced flange members having a series of axial openings circumferentially arranged adjacent the edges thereof, and said filaments extend through cooperating pairs of openings of the respective flange members and have their ends rigidly secured to said flange members.

9. A filar gear for meshing engagement with a rigid gear, said filar gear comprising a staff carrying axially spaced flange means, and a cylindrical array of taut, longitudinally resilient filaments carried by said flange means and constituting tooth elements of the filar gear.

10. A filar gear as claimed in claim 9, wherein said resilient filaments are non-metallic threads.

11. A filar gear as claimed in claim 9, wherein said flange means comprises a pair of axially spaced flange members having notched edges, and said filaments comprise a continuous winding of a thread seated in the notches of said flange members.

12. A filar gear comprising a staff carrying a single flange member having a series of openings circumferentially arranged adjacent the edge thereof, and transversely deflectible resilient filaments each having an end anchored in an opening of the flange member and a free end for meshing engagement with a second gear.

13. A filar gear as claimed in claim 12, wherein said filaments are bristles.

14. A filar gear as claimed in claim 12, wherein said filaments are wires.

FRANCIS X. LAMB.